Figure 1:
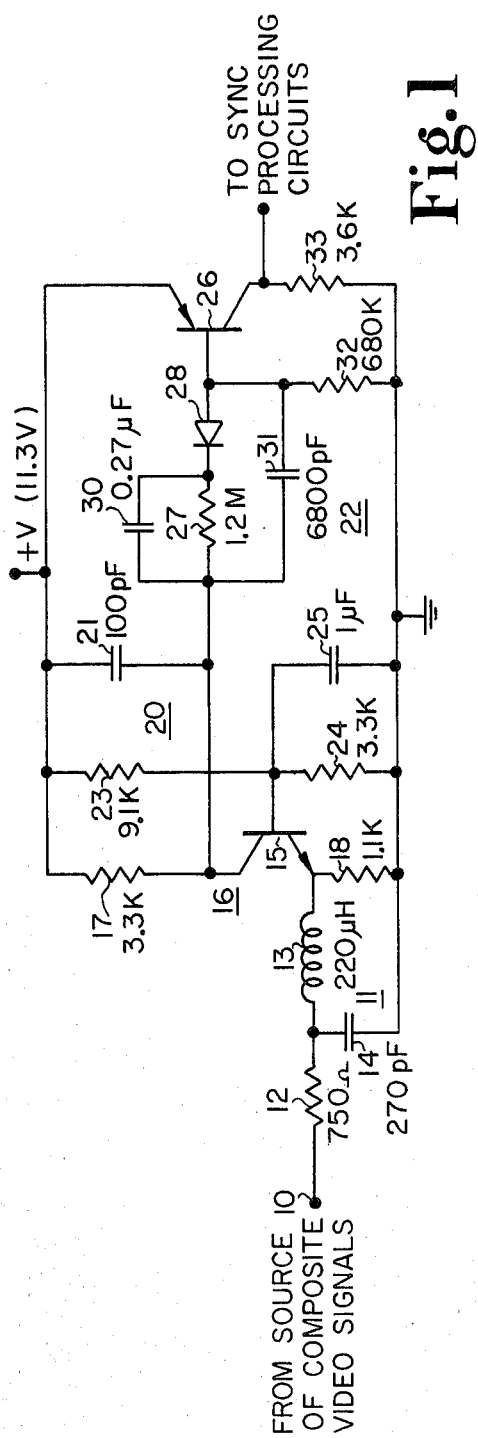

United States Patent [19]

Yost

[11] 4,400,733
[45] Aug. 23, 1983

[54] SYNCHRONIZING PULSE SEPARATOR
[75] Inventor: Thomas D. Yost, Indianapolis, Ind.
[73] Assignee: RCA Corporation, New York, N.Y.
[21] Appl. No.: 261,446
[22] Filed: May 8, 1981
[51] Int. Cl.³ .............................................. H04N 5/08
[52] U.S. Cl. .................................................. 358/155
[58] Field of Search ................................ 358/153, 155
[56] References Cited
U.S. PATENT DOCUMENTS

| 2,304,713 | 12/1942 | Smith ........................ 358/155 |
| 2,631,230 | 3/1953 | Marsh, Jr. ............................. 58/155 |
| 3,569,844 | 3/1971 | Lynn ............................... 358/153 |
| 3,609,232 | 9/1971 | Thomas ............................. 358/155 |
| 3,740,470 | 6/1973 | Rhee ................................ 358/155 |
| 3,876,828 | 4/1975 | Cook ............................... 358/153 |

Primary Examiner—Richard Murray

Attorney, Agent, or Firm—Paul J. Rasmussen; William H. Meise; Scott J. Stevens

[57] ABSTRACT

A synchronizing pulse separator providing output having reduced dependence upon the average signal amplitude level of the composite video signal input comprises a low pass filter coupled to the source of composite video signals. The low pass filter removes high frequency noise components in the composite video signal to reduce false triggering and mistriggering of the sync separator without significantly altering the contour of the sync pulses. A clipping amplifier reduces the sync pulse amplitude range in which the sync separator may trigger in order to reduce sync mistiming errors. A second low pass filter further removes noise from the amplified signal before the signal is applied to the sync pulse output generator.

9 Claims, 2 Drawing Figures

SYNCHRONIZING PULSE SEPARATOR

This invention relates to synchronizing pulse separators for television receivers and in particular to synchronizing pulse separators having improved noise rejection and stability.

The tuner, intermediate frequency (IF) and video detector circuitry of a television receiver processes the radio frequency input signal from an antenna or other source, such as a videodisc player or video tape recorder, to produce a composite video signal. The composite video signal includes luminance information and, in the case of a color signal, chrominance information. The composite video signal also includes horizontal and vertical synchronizing pulses which occur during the horizontal and vertical blanking intervals, respectively, and provides proper triggering of the deflection circuits to maintain line and field synchronism of the displayed raster.

In order to be usefully applied to the receiver deflection circuits, the synchronizing pulse information must be removed from the composite video signal. This is accomplished through the use of a sync separator or sync stripper, which utilizes the composite video signal as an input and generates an output during the presence of a horizontal or vertical sync pulse.

The sync pulses are specified to have an amplitude which is greater than the permissible amplitude of the video information, so the sync separator operates as a type of threshold detector, producing an output when an input having an amplitude exceeding a predetermined level is present. The sync separator output, comprising horizontal and vertical synchronizing information, is applied to a differentiator circuit, which is responsive to the narrow, short time duration horizontal pulses, but substantially unresponsive to the wider, longer duration vertical sync pulses. The differentiator output comprises only the horizontal sync information. The separator output is also applied to an integrator circuit, which is responsive to the vertical sync pulses for producing an output having only vertical sync information. The individual horizontal and vertical sync signals may then be applied to their respective deflection circuits.

The location of the sync pulse amplitude threshold level previously mentioned is a function of sync separator design. The sync pulse amplitude at which the sync separator output pulse generator triggers in order to generate an output must be carefully chosen on the basis of several factors in order to optimize the quality of the separator output. As the threshold level is moved closer to the base of the sync pulse (i.e., blanking level) noise may prematurely cause triggering of the sync separator, thereby causing false pulses. As the threshold level is moved closer to the tip of the sync pulse, improper separator triggering may also occur due to disruption of the contour of the sync pulse tip by thermal noise.

In some sync separators, the amplitude threshold level at which the separator produces an output is determined by the average signal amplitude level of the composite video signal. For example, a predominantly white picture will cause the sync separator output pulse generator to trigger at a different sync pulse amplitude than that determined by a predominantly black picture. With this type of sync separator, the predominant disruptive factor (false pulse or sync tip thermal noise) will be determined by the composite video signal average picture level (APL).

The previously described noise components occupy a relatively high frequency bandwidth, so it is possible to reduce their effect by processing the composite video signal by a low pass filter network prior to its application to the sync separator. Although this reduces the false pulse and thermal noise problem, the elimination of the high frequency components in the composite video signal spectrum also reduces the normally sharp contour of the sync pulses themselves, and in particular, the narrow horizontal pulses. The resultant horizontal sync pulses have slightly sloping rise and fall characteristics which become more aggravated near the sync pulse tip. With an APL-dependent sync separator, the variation in average picture level from one scanned line to the next will cause the sync separator to trigger at different locations along the rise slope of the sync pulses from line to line. This may result in slight timing errors since the time interval between sync separator output pulses will not always be constant. Some jitter or picture information misalignment may become apparent in the displayed picture.

The present invention is directed to a sync separator which is substantially unaffected by false pulse and thermal noise problems. The sync separator of the present invention is also not affected by the previously described timing errors to any appreciable degree.

In accordance with one aspect of the present invention, in a television receiver incorporating means for providing a composite video signal including a picture luminance signal and a horizontal synchronizing pulse, there is included means for separating the horizontal synchronizing pulse from the composite video signal in the presence of noise. The pulse separating means comprises a low pass filter means responsive to the video signal for substantially attenuating the noise signal without substantially attenuating the synchronizing pulse. A clipping amplifier is coupled to the low pass filter for removing that portion of the output signal from the low pass filter above a predetermined amplitude representative of a given picture luminance level. Means are coupled to the clipping amplifier for providing a separated horizontal synchronizing signal when the output signal from the clipping amplifier reaches an amplitude indicative of the presence of the horizontal synchronizing pulse within the composite video signal.

In accordance with another aspect of the present invention, first and second low pass filters of different types are coupled to the input and output respectively, of a video signal amplifier. Means coupled to the output of the second low pass filter provide a separated horizontal synchronizing signal.

Figure 2:
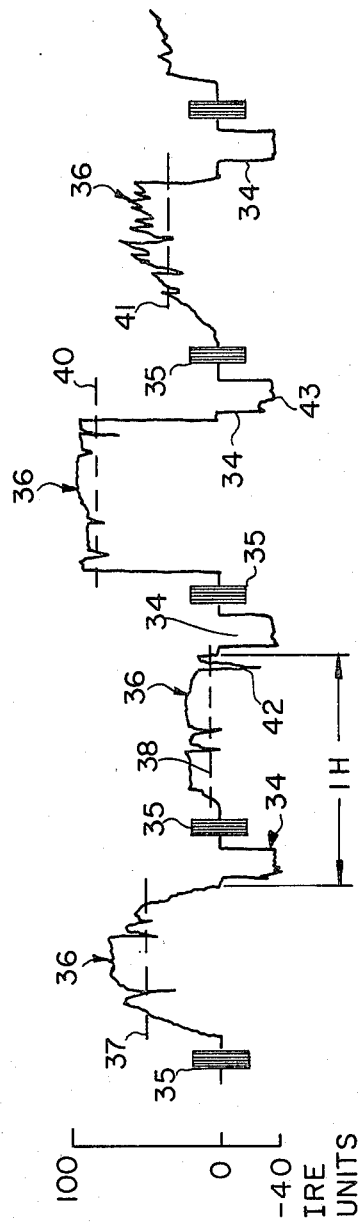

In the accompanying drawing,

FIG. 1 is a schematic diagram of a synchronizing pulse separator in accordance with the present invention;

and FIG. 2 illustrates a composite video signal waveform associated with the operation of the synchronizing pulse separator shown in FIG. 1.

Referring to FIG. 1, there is shown a synchronizing pulse separator circuit for use in a television receiver. The sync pulse separator receives an input at a terminal 10 from a source of composite video signals, such as the intermediate frequency and video detector circuits of a television receiver. The composite video signal input may be a color signal such as that shown in FIG. 2.

The video signal input is applied to a low pass filter 11. Low pass filter 11 comprises a resistor 12 coupled to an inductor 13. A capacitor 14 is coupled in shunt with inductor 13 to ground. Inductor 13 of low pass filter 11 is coupled to the emitter of a transistor 15. Transistor 15 comprises part of an amplifier stage 16. Amplifier stage 16 also includes a resistor 17 coupled to the collector of transistor 15 and to a source of potential designated by a terminal +V, and a resistor 18 coupled between the emitter of transistor 15 and ground. The output of amplifier stage 16 is applied to a second low pass filter 20 which comprises a capacitor 21 coupled between the collector of transistor 15 and the +V supply.

The remainder of the sync separator circuit of FIG. 1 embodies an output pulse generator 22 which produces output pulses during the presence of horizontal and vertical sync pulses in the composite video signal. Pulse generator 22 performs the actual sync separator function of the circuit shown in FIG. 1. Pulse generator 22 comprises a resistor 27 and a diode 28 coupled to the collector of transistor 15, and to the base of a transistor 26. A capacitor 30 is coupled in parallel with resistor 27 and a capacitor 31 is coupled in parallel with resistor 27 and diode 28. The base of transistor 26 is coupled to ground via a resistor 32, the emitter of transistor 26 is coupled to the +V supply and the collector of transistor 26 is coupled to ground via a resistor 33. The collector of transistor 26 is also coupled to the sync processing circuits of the television receiver. These processing circuits may include differentiating and integrating circuitry for respectively removing the horizontal and vertical sync pulses from the separator output composite sync signal.

FIG. 2 is a waveform of a representative color composite video signal, illustrating slightly more than four lines of video information. Each horizontal (1H) line of information includes a synchronizing pulse 34, a color phase burst signal 35, and a video information signal 36 which may vary from line to line. The synchronizing pulse and color phase signal occur during a horizontal blanking interval, which is not displayed on the kinescope screen. The dashed lines 37, 38, 40 and 41 illustrate the average amplitude of the picture portion of the composite video signal for each of the respective lines of information. The amplitude scale illustrated to the left of the composite video signal waveform is calibrated in IRE units, an arbitrary amplitude designation. For example, with waveform polarities as shown in FIG. 2, the designated "white level" is assigned a value of 100 IRE units, "black level" is 7-10 IRE units, blanking is 0 IRE units and sync tip is at −40 IRE units. For the circuit of FIG. 1, the peak-to-peak amplitude of the composite video signal is illustratively 2.63 volts, with the sync tip located at 2.5 volts. As can be seen in FIG. 2, the average video signal amplitude will vary from line to line depending on the picture luminance information content of each line. The value of average signal amplitude 37 is approximately 50 IRE units, average signal amplitude 38, representative of a predominantly black or dark picture, is approximately 15 IRE units. Average signal amplitude 40, representative of a predominantly white or light picture, is approximately 80 IRE units, and average signal amplitude 41 is approximately 30 IRE units.

Some sync separator output pulse generators trigger on the leading edge of the sync pulses at an amplitude dependent upon the average signal amplitude of the composite video signal. A high average signal level, for example, amplitude level 40, may cause the separator output pulse generator to trigger close to the blanking level while a low average signal level, for example amplitude level 38, may cause the output pulse generator to trigger close to sync tip. Problems may be associated with each of these extremes, as mentioned previously. High frequency noise pulses in the video signal, illustrated by a representative pulse 42 in FIG. 2, may cause false triggering of the separator output generator if the separator is set to trigger close to the blanking level. Thermal noise at the sync tip, illustrated by representative noise pulses 43 in FIG. 2, may also cause mistriggering of the sync separator output generator if it is set to trigger close to sync tip. Some sync separators utilize a low pass filter to remove some of the high frequency noise, thereby reducing some of the false or mistriggering problems. These low pass filters, however, also remove some high frequency components of the composite video signal, causing the sync pulses to become somewhat rounded, causing a less steep sync pulse leading edge and increasing the pulse rise time. The separator will therefore trigger at a point earlier in time when triggering near the blanking level than when triggering near the sync tip. Large variations in average signal level from line to line (extreme vertical luminance transistions) will cause mistiming of the sync separator from one line to the next, resulting in an appearance of vertical misalignment or jitter.

The operation of the sync separator of the present invention, and the techniques used to alleviate the previously described problems, will now be described. Low pass filter 11 of the sync separator in FIG. 1 is, for example, a second order Chebychev filter or a filter having a Chebychev-type rolloff response, with a cutoff frequency of 750 KHz. The use of a second or higher order Chebychev-type filter eliminates a large amount of high frequency noise without removing a significant portion of the video signal high frequency components. Low pass filter 11 therefore does not round the sync pulses significantly, but does remove a substantial portion of the thermal noise occurring at the sync tip.

Amplifier stage 16 operates as a clipping amplifier to limit the average signal level variations that are passed to the remaining portions of the sync separator. The clipping level of amplifier 16 is determined by the values of resistors 12, 17, 18, 23 and 24. Amplifier 16 of FIG. 1 is designed to clip the output signal from filter 11 above an amplitude representative of a composite video signal level of 50 IRE units. This limits the amplitude range at the input of sync separator 22 at which triggering can occur. By limiting the usable amplitude range, the trigger timing variations for a given sync pulse is reduced. The previously described mistiming and jitter problem is therefore significantly reduced.

Low pass filter 20, is, in the example of FIG. 1, a first order rolloff filter having a cutoff frequency of 500 KHz, which is lower than the cutoff frequency of low pass filter 11. Low pass filter 20 further reduces high frequency noise and consequently reduces false and mistriggering problem. The previously described operation of clipping amplifier 16 prevents aggravation of any mistiming problem which would otherwise be caused by the operation of low pass filter 20.

Output pulse generator 22 comprises the actual sync separator or stripper stage of the sync separator shown in FIG. 1. Output pulse generator 22 is of known design having two time constants. One time constant which is essentially determined by the values of resistor 32 and capacitor 31 is of relatively short duration to be effective with respect to the horizontal sync pulses. The other time constant, essentially determined by the values of resistor 27 and capacitor 30, is effective with respect to the longer vertical sync pulses. In the case of horizontal sync pulses, the voltages to which capacitor 31 charges and discharges during the horizontal line intervals are determined by the output of clipping amplifier 16. The capacitor voltage will in turn determine the sync pulse amplitude at which transistor 26 of output pulse generator 22 turns on.

The sync separator of the present invention, therefore, reduces false and mistriggering problems caused by noise through the use of different type low pass filters 11 and 20 at the input and output terminals of amplifier 16, respectively. The sync separator further reduces timing errors by reducing the average signal amplitude of the filtered composite video signal during the picture interval of each horizontal line through the use of nonlinear clipping amplifier 16. The use of a single high order low pass filter at the location of filter 20 in place of low pass filters 11 and 20 would allow high frequency noise to be processed by amplifier 16, where it would affect the average signal level and cause modulation of the clipping level of amplifier 16, thereby aggravating timing errors and jitter.

The previously described sync separator, by reducing the sync pulse trigger amplitude variations, may improve the performance of a receiver having non-keyed AGC circuits which increase sync pulse rise time, or receivers that operate the sync separator with a fairly low B+ supply, thereby increasing the separator trigger level dependence on average video signal level. The improvement in noise elimination of the previously described sync separator may also improve performance in a receiver having a video equalizer, or in a receiver adjusted to accommodate the playing of video tapes encoded to prevent unauthorized duplication.

What is claimed is:

1. In a television receiver incorporating means for providing a composite video signal including a picture luminance signal and a horizontal synchronizing pulse, means for separating said horizontal synchronizing pulse from said composite video signal in the presence of noise, comprising:

a first low pass filter responsive to said video signal for substantially attenuating said noise without substantially attenuating said synchronizing pulse;

an amplifier coupled to said low pass filter for amplifying a portion of the output signal from said low pass filter;

a second low pass filter responsive to said amplifier output for further attenuating said noise signal; and means coupled to said second low pass filter for providing a separated horizontal synchronizing signal when the output signal from said second low pass filter reaches an amplitude indicative of the presence of said horizontal synchronizing pulse within said composite video signal.

2. The arrangement defined in claim 1, wherein said first low pass filter exhibits a Chebychev-type response of at least a second order.

3. The arrangement defined in claim 1, wherein said second low pass filter exhibits a first order rolloff characteristic.

4. The arrangement defined in claim 1, wherein the cutoff frequency of said first low pass filter is above the cutoff frequency of said second low pass filter.

5. The arrangement defined in claim 1, wherein the cutoff frequency of said first low pass filter is of the order of 750 KHz, and the cutoff frequency of said second low pass filter is of the order of 500 KHz.

6. The arrangement defined in claim 1, wherein the amplitude indicative of the presence of said horizontal synchronizing pulse is determined by the amplitude of the output of said amplifier.

7. The arrangement defined in claim 1, wherein said amplitude at which said means provides a separated horizontal synchronizing signal varies in response to changes in the amplitude of a signal representative of the level of said picture luminance signal.

8. The arrangement defined in claim 1, wherein said amplifier comprises a clipping amplifier for removing that portion of the output signal from said low pass filter above a predetermined amplitude representative of a given picture luminance signal level.

9. The arrangement defined in claim 8, wherein said clipping amplifier reduces the amount of variation of said amplitude at which said means provides a separated horizontal synchronizing signal.

* * * * *